(12) United States Patent
Nansen et al.

(10) Patent No.: US 9,475,252 B2
(45) Date of Patent: Oct. 25, 2016

(54) SYSTEM AND METHOD FOR REDUCING CORE OF A METALLIC HONEYCOMB PANEL STRUCTURE

(71) Applicants: David S. Nansen, Renton, WA (US); Trevor J. Violett, Bothell, WA (US)

(72) Inventors: David S. Nansen, Renton, WA (US); Trevor J. Violett, Bothell, WA (US)

(73) Assignee: The Boeing Company, Chicago, IL (US)

(*) Notice: Subject to any disclaimer, the term of this patent is extended or adjusted under 35 U.S.C. 154(b) by 254 days.

(21) Appl. No.: 14/242,149

(22) Filed: Apr. 1, 2014

(65) Prior Publication Data

US 2015/0273787 A1   Oct. 1, 2015

(51) Int. Cl.
| | |
|---|---|
| *B32B 3/12* | (2006.01) |
| *B32B 15/04* | (2006.01) |
| *B32B 3/02* | (2006.01) |
| *B32B 3/08* | (2006.01) |
| *B32B 3/26* | (2006.01) |
| *B32B 3/30* | (2006.01) |
| *E04C 2/36* | (2006.01) |
| *F16B 5/01* | (2006.01) |

(52) U.S. Cl.
CPC . *B32B 3/12* (2013.01); *B32B 3/02* (2013.01); *B32B 3/08* (2013.01); *B32B 3/263* (2013.01); *B32B 3/30* (2013.01); *B32B 15/043* (2013.01); *E04C 2/365* (2013.01); *F16B 5/01* (2013.01); *B32B 2250/40* (2013.01); *B32B 2307/50* (2013.01); *B32B 2419/00* (2013.01); *B32B 2605/00* (2013.01); *Y10T 29/49616* (2015.01); *Y10T 428/24149* (2015.01)

(58) Field of Classification Search
CPC ............... Y10T 29/49616; Y10T 428/24149
See application file for complete search history.

(56) References Cited

U.S. PATENT DOCUMENTS

| | | | |
|---|---|---|---|
| 2,720,948 A * | 10/1955 | Pajak | E04C 2/365 156/65 |
| 3,110,064 A * | 11/1963 | Koontz | E04B 1/6104 52/520 |
| 3,476,422 A | 11/1969 | Campbell | |
| 3,526,072 A * | 9/1970 | Campbell | F16B 5/01 29/452 |
| 3,785,788 A * | 1/1974 | Haggberg | B21D 47/00 29/423 |
| 3,815,215 A * | 6/1974 | Medawar | B21D 47/00 264/267 |
| 3,842,486 A | 10/1974 | Gerard | |
| 3,940,891 A * | 3/1976 | Slysh | B64G 9/00 244/119 |
| 4,254,188 A | 3/1981 | Campbell et al. | |
| 4,335,174 A | 6/1982 | Belko | |
| 4,855,182 A | 8/1989 | Ondrejas et al. | |
| 4,931,340 A | 6/1990 | Baba et al. | |

(Continued)

*Primary Examiner* — Jacob Cigna
(74) *Attorney, Agent, or Firm* — McDonnell Boehnen Hulbert & Berghoff LLP

(57) ABSTRACT

A method and system for forming a honeycomb panel structure. The method includes the steps of compressing the honeycomb panel structure in a first panel region and reinforcing the first panel region. Reinforcing the first panel region may include the steps of drilling a plurality of holes in the first panel region; inserting pins into the first panel region; and welding pins into a face sheet of the honeycomb panel structure. Alternatively, the step of reinforcing the first panel region may include the step of adding an additional face sheet to the honeycomb panel structure.

14 Claims, 14 Drawing Sheets

(56) References Cited

U.S. PATENT DOCUMENTS

| | | | |
|---|---|---|---|
| 5,417,788 A * | 5/1995 | Holt | B29C 59/02 156/196 |
| 5,635,306 A | 6/1997 | Minamida et al. | |
| 5,913,766 A * | 6/1999 | Reed | B29C 59/04 493/352 |
| 5,972,524 A | 10/1999 | Childress | |
| 7,371,304 B2 | 5/2008 | Christman et al. | |
| 7,531,058 B2 * | 5/2009 | Grose | B32B 3/02 156/304.3 |
| 7,574,835 B2 | 8/2009 | Bohlmann | |
| 2011/0300329 A1 * | 12/2011 | Kowalski | B32B 3/12 428/116 |
| 2013/0269742 A1 | 10/2013 | Pingree et al. | |
| 2013/0278009 A1 * | 10/2013 | Preisler | B60R 13/0275 296/97.23 |
| 2014/0147622 A1 * | 5/2014 | Preisler | B29C 43/00 428/116 |

\* cited by examiner

SYSTEM AND METHOD FOR REDUCING CORE OF A METALLIC HONEYCOMB PANEL STRUCTURE

FIELD

The present disclosure relates to metallic sandwich structures such as honeycomb panel structure. More specifically, the present disclosure relates to methods and apparatus for reducing or compressing a core of a honeycomb panel structure.

BACKGROUND

Metallic honeycomb panels or sandwich structures have been increasingly used on advanced designs for vehicles such as aircraft and ships. Reasons for using metallic sandwich structures include saving weight as compared to steel structures, reducing radar cross section increasing corrosion resistance, and reducing life cycle costs.

Although such sandwich structures can offer certain superior bending stiffness properties over other design configurations, one issue that may tend to limit the usage of sandwich structures is the difficulty of attaching the structure to adjacent structures or attachment fittings with adequate load transfer at the attachment region without undue increase in weight and cost. While in certain situations it can be relatively easy to attach sandwich structures when the applied loads are low, it is quite a challenge to do so for highly loaded structure.

Various honeycomb attachment procedures have been developed. For example, one method of joining structural members such as metallic structural members utilizes a core ramp down region. In such a process, the honeycomb core residing between the facing sheets must be eliminated either through the fabrication of the core or must be machined down after core manufacturing. Such processes are expensive, they also still require some type of attachment fitting between the honeycomb panel and some other supporting structure, and may be prone to certain heightened failure modes if the ramp down is either too steep or too shallow.

Alternatives to core ramp-down include the use of mechanical inserts, bushings, or other types of mechanical attachment fittings that must be integrated within the panel. However, the use of such attachment fittings can also present certain shortcomings. For example, to install certain fittings within a panel, a section of the panel must be cut out and a machined fitting is inserted into the panel or must be welded to the face sheets of the panel. This increases the overall cost of the sandwich structure while also increasing the time to manufacture as well.

There is, therefore, a need for a more cost effective and less labor intensive method of assembling honeycomb core structures. Such a desired cost effective and less labor intensive assembled structures should also offer a more robust and efficient method of providing a seal to the edges of a honeycomb panel while also increasing manufacturing facility throughput while also driving down overall system manufacturing costs.

SUMMARY

According to an exemplary arrangement, a method and system for forming a honeycomb panel structure is presented. The method includes the steps of compressing the honeycomb panel structure in a first panel region and reinforcing at least a portion the first panel region. Reinforcing the first panel region may include the steps of drilling a plurality of holes in the first panel region; inserting pins into the first panel region and welding the pins into a face sheet of the honeycomb panel structure. Alternatively, the step of reinforcing the first panel region may include welding an additional face sheet to the pins of the honeycomb panel structure.

The step of reinforcing at least a portion of the first panel region may also comprise the steps of utilizing at least one welded pin to add at least one additional face sheet to the honeycomb panel structure. In one arrangement, the honeycomb panel comprises a metallic honeycomb panel. The method may also include the step of drilling a plurality of holes in an uncompressed panel region adjacent the first panel region; inserting a second plurality of pins into the un-compressed panel region; and welding the second plurality of pins into a face sheet of the honeycomb panel structure. In addition, the method may comprise the step of inserting the second plurality of pins into the panel region substantially vertical to a bottom face sheet of the honeycomb panel structure.

In one arrangement, the method may include the step of attaching at least one additional face sheet to at least a portion of the compressed core region. The method may also include the step of completely compressing the honeycomb panel structure in the first region. Alternatively, the step of compressing the honeycomb panel structure may comprise the step of partially compressing the honeycomb panel structure in the first region.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The present disclosure provides for embodiments of a metallic honeycomb panel structure having at least one reduced or compressed honeycomb core region and a method for making the same. Embodiments of the structure and method may be used in aircraft, spacecraft, motor craft, watercraft, and other craft, as well vehicles and other similar structures. In addition, embodiments of the structure and method may be used with integrated commercial building materials for both cooling applications, as well as energy harvesting from lightweight structures.

Figure 1:
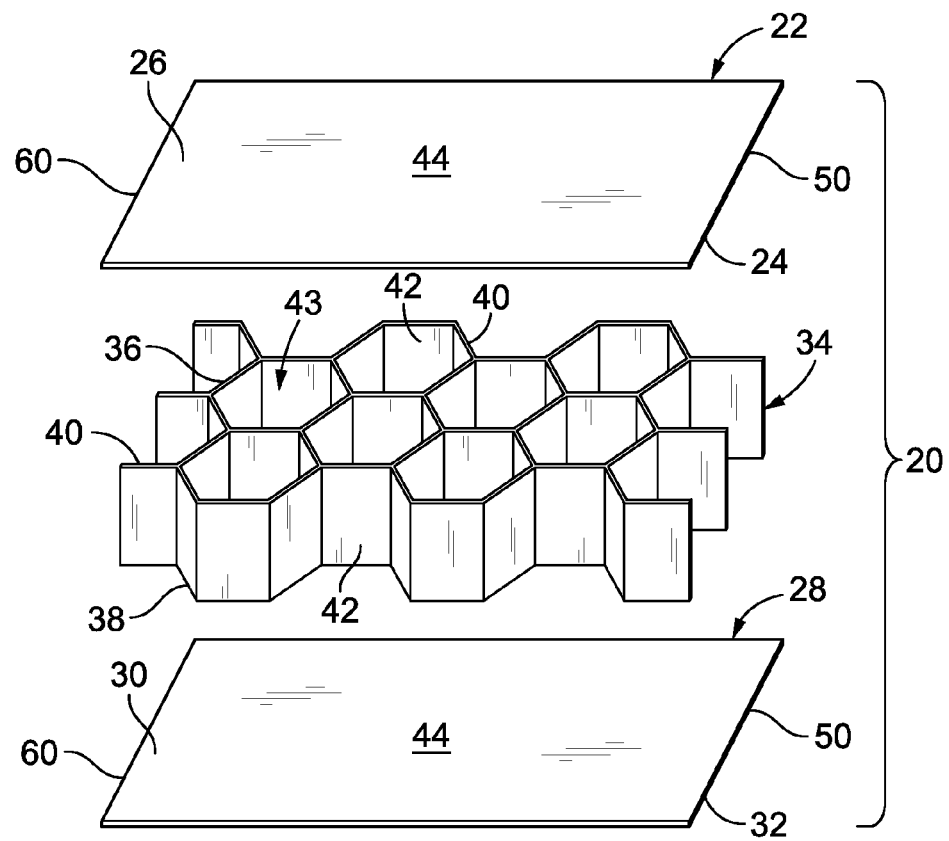
FIG. 1 illustrates an exploded perspective view of one of the embodiments of a honeycomb panel structure of the disclosure.
Figure 2:
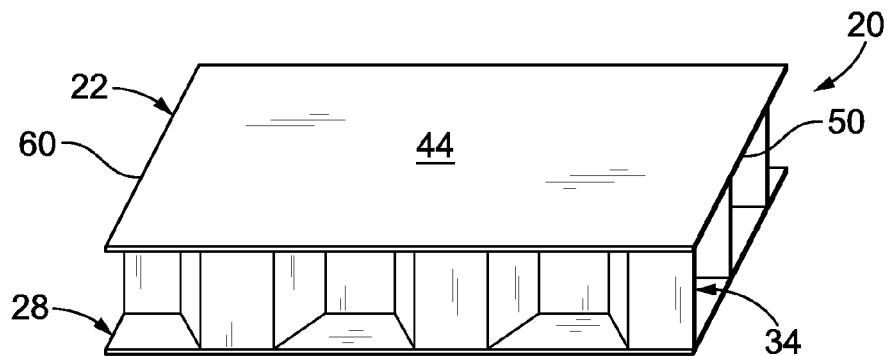
FIG. 2 illustrates a fully assembled perspective view of the honeycomb panel structure illustrated in FIG. 1.

FIG. 1 is an illustration of an exploded perspective view of one of the embodiments of an un-crushed or an un-compressed metallic honeycomb panel structure 50 of the disclosure. FIG. 2 is an illustration of a fully assembled perspective view of the integrated metallic structure 50 of FIG. 1. In one of the embodiments of the disclosure, there is provided the metallic structure 20. The metallic structure 20 comprises a first or top face sheet 22 having an interior side 24 and an exterior side 26. The embodiment of the metallic construction 20 illustrated in FIG. 2 comprises at least one substantially planar or flat portion. However, as will be discussed below, in other embodiments, the construction 20 may have one or more curvatures and may be formed into a variety of non-planar shapes. In addition, although the metallic construction 20 is illustrated as having a constant height, alternative metallic constructions having non-uniform height may also be used.

The metallic structure 20 further comprises a second or bottom face sheet 28 having an interior side 30 and an exterior side 32. Preferably, the first or top face sheet 22 and the second or bottom face sheet 28 may also be comprised of metal materials, such as aluminum, titanium or any another suitable metal or another suitable material. The thickness of the first and second face sheets 22, 28 may preferably be from about 0.005 inch to about 0.1 inch thick or of another suitable thickness. Alternatively, the first face sheet 22 and the second face sheet 28 comprise metallic materials. Suitable metallic materials may comprise alloys of titanium, aluminum, steel or corrosion resistant steel or another suitable alloys. The first and second face sheets 22, 28 may comprise the same metallic material or dissimilar material. In addition, the first and second face sheets 22, 28 may comprise the same or a different thickness.

The metallic structure 20 further comprises a honeycomb core 34 assembled between the first face sheet 22 and the second face sheet 28. Typically, the honeycomb core may be either resistance welded or brazed to the first and second face sheets 22 and 28, respectively. The honeycomb core 34 has a first end 36 adjacent the interior side 24 of the first face sheet 22. The honeycomb core 34 has a second end 38 adjacent the interior side 30 of the second face sheet 28. A localized region/area or center portion 44 of the core resides between a first end 50 and a second end 60 of the honeycomb panel 20. The honeycomb core 34 has first sides 40 and second sides 42. The honeycomb core 34 may comprise cells 43 having a hexagonal shape. Hexagonal cells provide a minimum density for a given amount of material comprising the honeycomb core. Alternatively, the honeycomb core may comprise cells having another suitable shape.

As will be described in greater detail below, the present disclosure relates to methods and systems for taking a honeycomb panel structure (such as the structure illustrated in FIGS. 1 and 2) undergoing a controlled compress or crush of a core region of the honeycomb structure. The compressed core region may be located at one or both ends of the honeycomb panel (e.g., at ends 50, 60) and/or may be provided at the localized region/area or center 44 of the core. In addition, if called for by the structure specification and design, the disclosed method and system may provide one or more structural reinforcements to the compressed honeycomb panel. Such a structural reinforcement may comprise pins and/or doublers (i.e., one or more additional face sheets) to the honeycomb panel. If one or more pins are used, such pins may be of similar or dissimilar materials and/or mechanical properties. Similarly, if one or more additional face sheets are used, such additional face sheets may comprise similar or dissimilar materials or mechanical properties.

Figure 3:
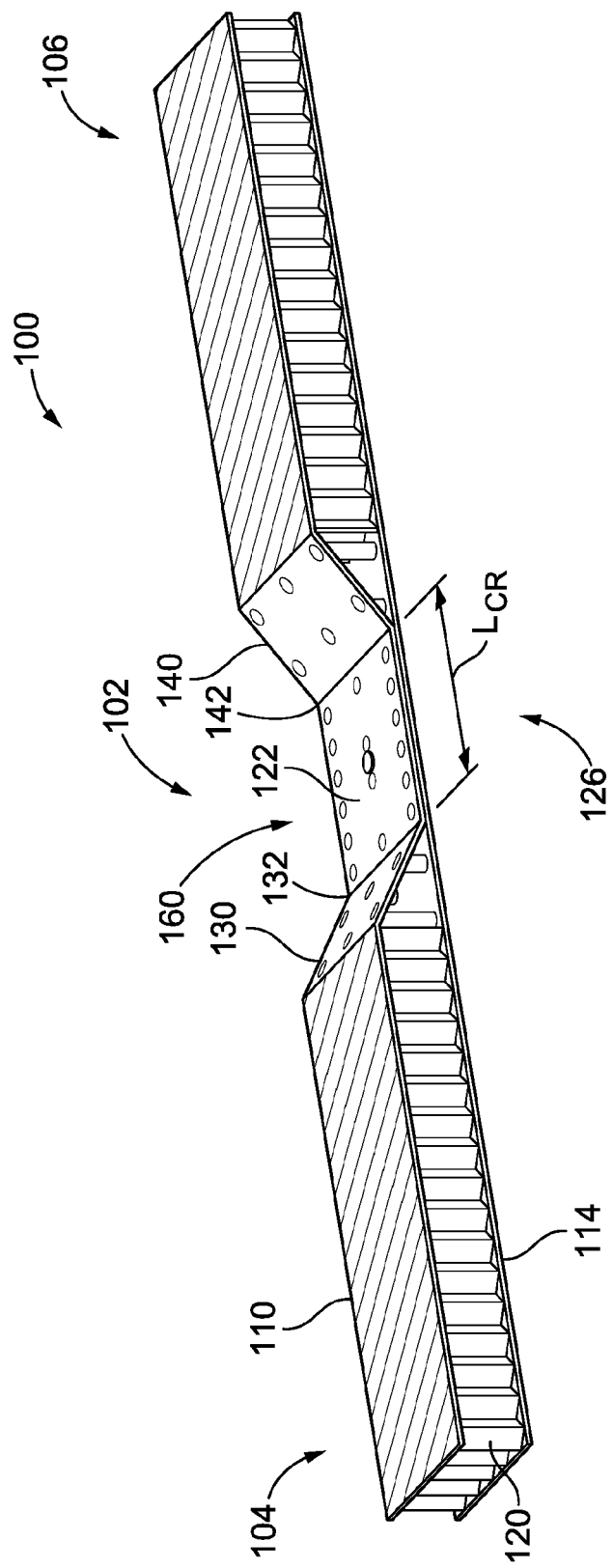
FIG. 3 illustrates a perspective view of one of the embodiments of a honeycomb panel structure with a compressed core region.
Figure 4:
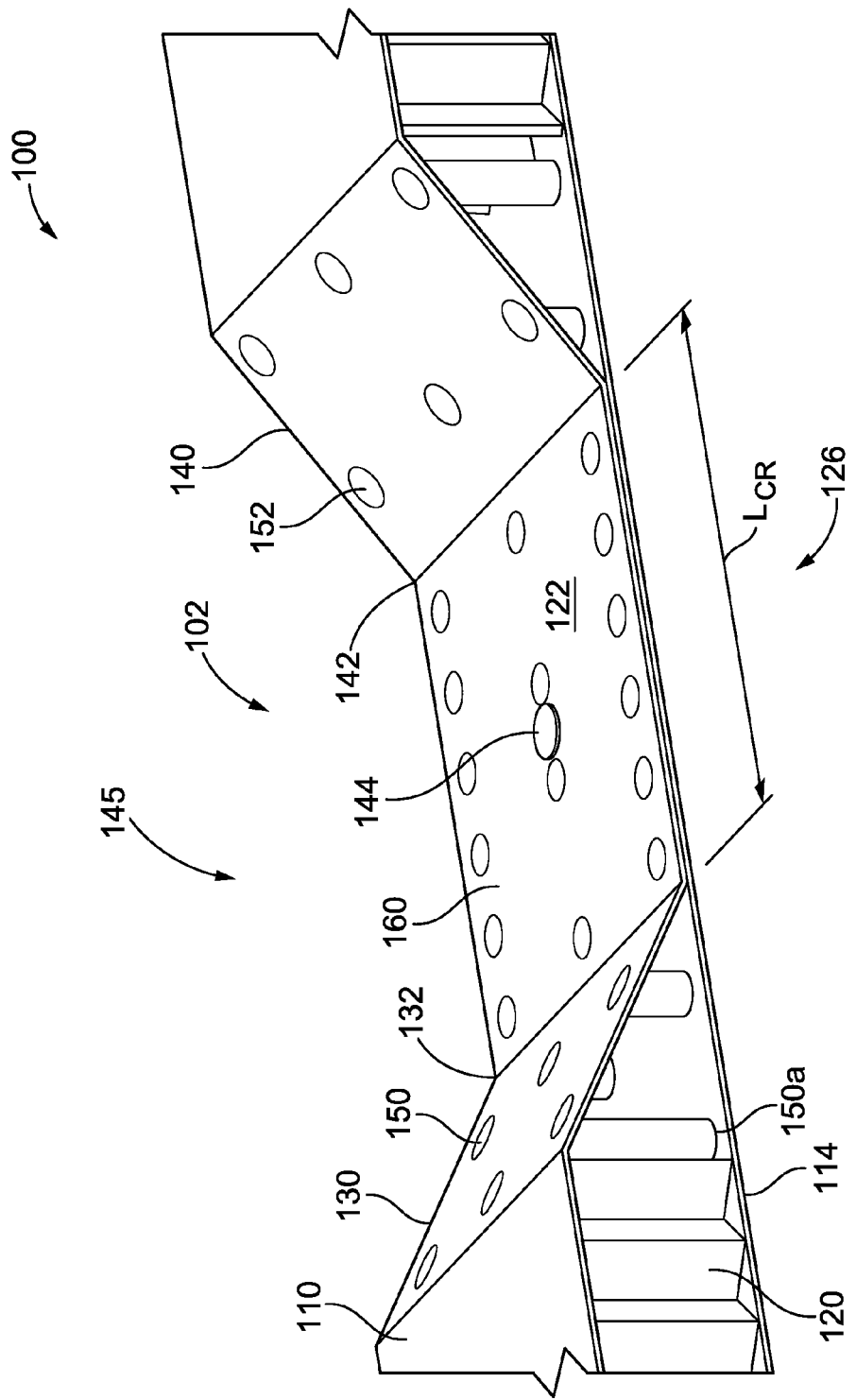
FIG. 4 illustrates a close up view of the honeycomb panel structure with a compressed core region illustrated in FIG. 3.

FIG. 3 illustrates a first arrangement of a honeycomb panel structure 100 comprising a compressed core region 102. FIG. 4 illustrates a close up view of the compressed core region 102 of the honeycomb panel structure 100 illustrated in FIG. 3. The honeycomb panel structure 100 illustrated in FIGS. 3 and 4 comprises essentially the same structure of the honeycomb panel structure illustrated in FIGS. 1 and 2. That is, this honeycomb panel structure 100 comprises a honeycomb core assembled between a first or top face sheet 110 and a second or bottom face sheet 114 and a honeycomb core 120 residing between these two sheets. For ease of illustration, in FIGS. 3 and 4, a portion of the honeycomb core 120 between the top face sheet 110 and the bottom sheet 114 along the first and second inclines 130, 140 has been omitted to illustrate certain internal structural reinforcements.

As mentioned herein, there may be possible honeycomb applications where the top and bottom face sheets 110, 114 comprise different thicknesses and/or materials. For example, the first or top face sheet 110 may comprise a first thickness and the second or bottom face sheet 114 may comprise a second thickness wherein the first thickness of the first face sheet 110 is different than the second thickness of the second face sheet 114. In those cases, there may be structural differences between the two compressed regions depending on the original face sheet thicknesses, the possible addition of doublers (e.g., additional face sheets) to one or the other or both face sheets 110, 114, and whether the panel is compressed from the top face sheet 110, the bottom face sheet 114, and/or both. In fact, in certain applications, the doublers could be tailored in thickness and extent (e.g., a doubler comprising a non-uniform thickness) to meet particular mechanical performance requirements. The remaining compressed core arrangements discussed in the present disclosure may comprise such structural differences as well.

As illustrated, the honeycomb panel structure 100 comprises a constant height (aside from the compressed panel region 102) and the honeycomb panel 100 extends from a first end 104 to a second end 106, the first compressed region 102 residing in between the first end and the second end. Although only one compressed region 102 is illustrated in this exemplary embodiment of FIG. 3, those of skill in the art will recognize more than one compressed region may be provided in this honeycomb panel 100.

As illustrated in FIG. 3, the compressed core region 102 comprises a fully compressed core region. That is, the upper face sheet 110 has been fully compressed against the core 120 and the bottom face sheet 114. In certain arrangements and for certain applications and as will be described in greater detail herein, the compressed core region may comprise a partially compressed core region. That is, in one such a partially compressed core region arrangement, the upper face sheet 110 would only be partially compressed against the core 120 and the bottom surface sheet 114 such that the height of the partially compressed region would be lower than the un-compressed panel height illustrated in FIG. 3 but yet higher than the compressed core region 102. In certain arrangements and for certain applications and as will be described in greater detail herein, the compressed core region may comprise a localized region, such as a localized compressed core region, located on the panel 100 somewhere between the first and second ends 104, 106.

As can be clearly seen from FIG. 4, the compressed core region 102 of the honeycomb panel structure 100 extends along a generally, planar compressed core region 122 having length $L_{CR}$ 126. This generally planar compressed region 122 extends from a bottom portion 132 of a first ramp or first incline 130 to a bottom portion 142 of a second ramp or second incline 140.

The controlled crush or compression of the first region 102 may degrade certain performance characteristics of the core 120 and may thereby result in a loss of stability in the face sheet 110. To re-establish face sheet stability, the honeycomb panel structure 100 may be provided with one or more structural reinforcements 145. Specifically, such structural reinforcements 145 may comprise one or more weld pins, one or more a doublers (i.e., one or more additional face sheets), or, in some applications, perhaps both types of structural reinforcements—i.e., both pins and doublers.

For example, as also illustrated in FIGS. 3 and 4, various structural weld pins 150 are provided to support the first ramp 130. Similarly, various structural weld pins 152 are provided to support the second incline 140. For example, in this illustrated arrangement, six pins are provided along the first ramp 130 and six pins may also be provided along the second incline 140.

Figure 16:
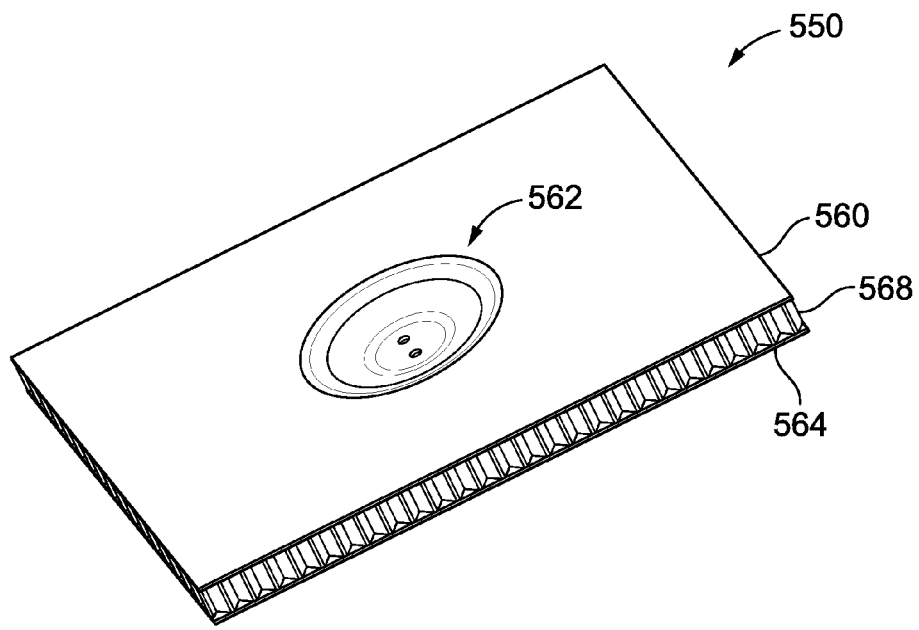
FIG. 16 illustrates an alternative view of another embodiment of a honeycomb panel structure with a compressed core region.

Aside from providing structural reinforcements along the first and second inclines 130, 140 in the form of weld pins, structural reinforcements may also be provided along the compressed core region 102. For example, as illustrated in FIGS. 3 and 4, 16 pins are provided along the planar compressed core region 122.

As can be seen from FIG. 4, the pins along the first ramp or incline 130 extend vertically from the bottom face sheet 114 upwards towards the first ramp or incline 130. For example, weld pin 150a extends vertically from the bottom face sheet 114 upwards through the core 120 towards the inclined top sheet 110. Similarly, the weld pins 152 provided along the second incline 140 extend vertically from the bottom face sheet 114 upwards towards the second incline 140.

Aside from providing structural reinforcements along the first and second inclines 130, 140 in the form of weld pins 150, structural reinforcements may also be provided along the compressed core region 102. For example, as illustrated in FIGS. 3 and 4, 16 pins are provided along the planar compressed core region 122. A first type of weld pin may be used to support the planar compressed core region 122 and a second, different type of weld pin may be used to support the first and second inclines 130, 140, respectively.

Returning to the close up view of compressed panel 100 illustrated in FIG. 4, the compressed region 102 may be provided with weld pins but may also be provided with another structural reinforcement by way of a doubler 160 welded along the compressed region. Preferably, the doubler comprises a similar material as the first or top face 110 of the honeycomb panel 100. In this illustrated arrangement, the doubler 160 extends from along the planar compressed region 122 from the bottom portion 132 of the first incline 130 to the bottom portion 142 of the second incline 140. In an alternative arrangement, more than one doubler may be provided along the compressed region 102.

Alternatively, again based the design and loading parameters, different doubler configurations may also be utilized. As just one example, the doubler 160 may be provided along the compressed core planar region 122 and may extend partially up one or both of the first and second inclines 130, 140, respectively. In yet another alternative example, the doubler 160 may be provided extending up and over one or both of the inclines.

Additionally, a fastener hole 144 for fastening the honeycomb panel to other structures has been drilled near the middle of the compressed region 102. This mounting hole may be drilled and may be used to mount an attachment fitting. Although only one fastener hole is illustrated, more than one such hole can be provided.

The location, the orientation, and the number of pins and/or doublers may vary based on the design load parameters of the honeycomb panel structure 100 as determined, for example, during component and subcomponent specification and design. As just one example, in one alternative weld pin configuration, the weld pins 150, 160 may be installed perpendicular to the first and second inclines 130, 140, respectively.

Figure 15:
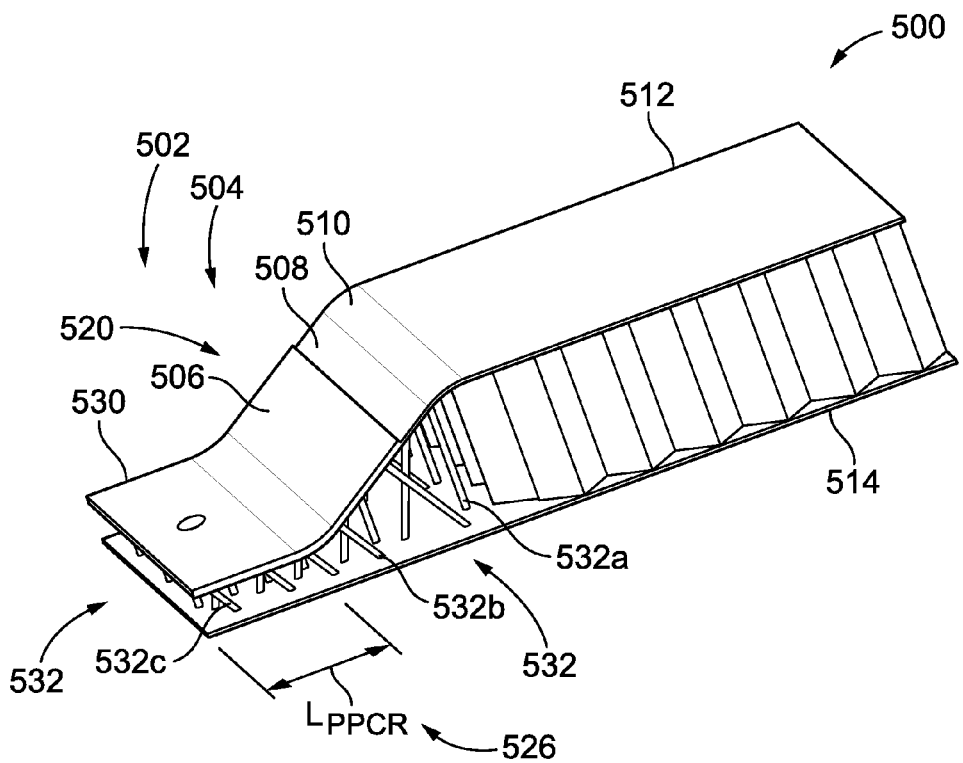
FIG. 15 illustrates a perspective view of another embodiment of a honeycomb panel structure with a compressed core region.

For example, FIG. 15 illustrates a perspective view of another embodiment of a honeycomb panel structure 500 comprising a compressed core region 502. In this illustrated embodiment, this compressed core region 502 comprises a partially crushed core region. The compressed core region 502 comprises a core region incline 520 extending from the partially crushed core region to the top face sheet 512. In addition, a plurality of structural reinforcements 504 are also provided. Such structural reinforcements 504 include a plurality of additional face sheets 506, 508, 510 and a plurality of weld pins 532. Specifically, a first plurality of weld pins are provided to support the first incline 520. Similarly, various structural weld pins 532 may be provided to support a generally, planar and partially compressed region 530 having length designated as $L_{PPCR}$ 526. As can be seen from FIG. 15, certain of these weld pins are oriented so that they extend vertically upward from the bottom face sheet 514 upwards towards the incline 520 (e.g., weld pin 532a). In addition, certain of these weld pins are oriented so that they reside perpendicular to the first incline 520 (e.g., weld pin 532b) and yet other of these weld pins are oriented at different angles between the bottom face sheet 514 and the partially compressed region 530 (e.g., weld pin 532c). As those of skill in the art will recognize, alternative weld pin configurations may also be used.

Figure 5:
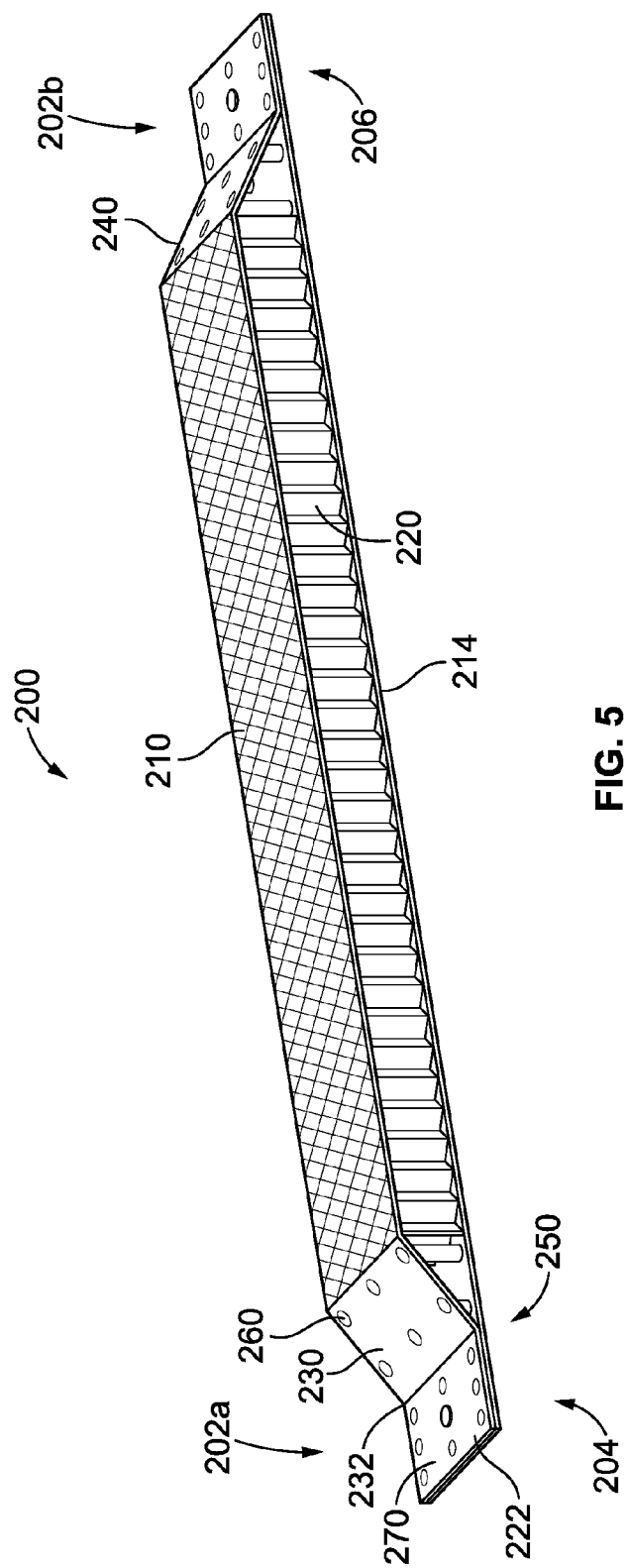
FIG. 5 illustrates a perspective view of another embodiment of a honeycomb panel structure with a compressed core region.

FIG. 5 illustrates another arrangement of a honeycomb panel structure 200 comprising two compressed core regions 202 a, b. The honeycomb panel structure 200 illustrated in FIG. 5 comprises essentially the same structure of the honeycomb panel structure illustrated in FIGS. 1 and 2. That is, this honeycomb panel structure 200 comprises a honeycomb core 220 assembled between a first or top face sheet 210 and a second or bottom face sheet 214. For ease of illustration, in FIGS. 5 and 6, a portion of the honeycomb core 220 residing between the top face sheet and the bottom sheet 214 along the first and second inclines 230, 240 has been omitted to illustrate certain internal structural reinforcements (i.e., various weld pins).

As illustrated, the honeycomb panel structure 200 comprises a constant height (aside from the two compressed panel regions 202 a, b) and the honeycomb panel structure 200 extends from a first end 204 to a second end 206. The first compressed region 202a resides near the first end 204 and the second compressed region 202b resides near the second end 206. Although the two compressed regions 202 a, b reside near the ends of the honeycomb panel structure 200 is illustrated in this exemplary embodiment of FIG. 5, those of skill in the art will recognize that yet a third or even a fourth compressed region (similar to the compressed core region 102 illustrated in FIGS. 3 and 4) may be provided along this honeycomb panel structure 200 as well.

As illustrated in FIG. 5, the compressed core regions 202 a, b comprises fully compressed core regions. That is, at both compressed core regions, the top face sheet 210 has been fully compressed against the core 220 and the bottom face sheet 214. In certain arrangements and for certain applications, either or both of the compressed core regions may comprise a partially compressed core region, such as the partially compressed core region 502 illustrated in FIG. 15.

Figure 6:
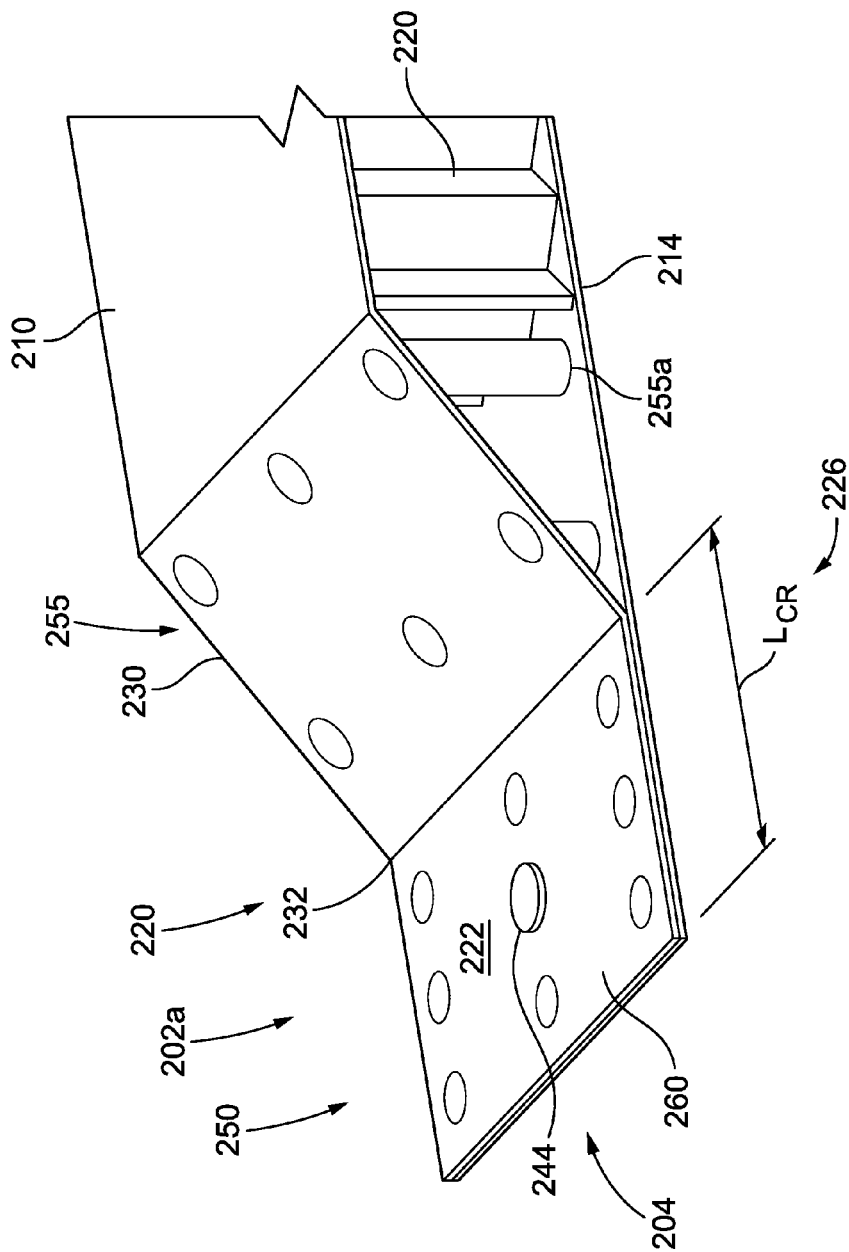
FIG. 6 illustrates a close up view of the honeycomb panel structure with a compressed core region illustrated in FIG. 5.

FIG. 6 illustrates a close up view of the first compressed core region 202a of the honeycomb panel structure 200 illustrated in FIG. 5. As illustrated in FIGS. 5 and 6, both compressed core regions 202 a, b of the honeycomb panel structure 200 extend along a generally, planar compressed region. For example, the compressed core region 202a extends along a generally, planar compressed core region 222 having length $L_{CR}$ 226. This generally planar compressed core region 222 extends horizontally from the first end 204 of the panel structure 200 to a start 232 of a first ramp or first incline 230. The second compressed core region 202b is structured in a similar manner. As illustrated, both the first and the second inclines 230, 240 include generally the same angle of inclination. However, this does not have to be the case and may be determined during the specification and design phase of the honeycomb structure.

The controlled compress or compression of the first compressed core region 202a may damage the core 220 and may thereby result in a loss of stability in the top face sheet 210. To re-establish and in some instances increase overall face sheet stability, the honeycomb panel structure 200 may be provided with one or more structural reinforcements 250. Specifically, such structural reinforcements 250 may comprise one or more weld pins, one or more a doublers (i.e., one or more additional face sheets), or, in some applications, perhaps both types of structural reinforcements—both pins and doublers-may be used.

Referring now to the FIGS. 5 and 6, various structural weld pins 255 are provided to support the first ramp 230. Similarly, various structural weld pins may be provided to support the second ramp 240. For example, in this illustrated arrangement, six pins are provided along the first ramp 230 and six pins may also be provided along the second ramp 240.

Aside from providing structural support members along the inclines 230, 240, structural support members may also be provided along the compressed core regions 202 a,b. For example, as illustrated in FIGS. 5 and 6, eight (8) pins may be provided along the planar compressed core region 222. As can be seen from FIGS. 5 and 6, the pins along the first ramp/incline 230 extend vertically from the bottom face sheet 214 upwards towards the first incline 230. For example, weld pin 255a extends vertically from the bottom face sheet 214 upwards through the core 220 towards the inclined top sheet 210. Similarly, the pins provided along the second incline extend vertically from the bottom face sheet 214 upwards towards the second incline 240. The location and number of pins may vary based on the loading parameters of the honeycomb panel structure 200 as determined, for example, during component and subcomponent specification and design. In an alternative weld pin configuration, the weld pins may be installed in different orientations, such as perpendicular to the incline.

As noted above, the compressed core panel may be provided with certain structural reinforcements by way of pins and/or doublers. For example, as can be seen from the close up view of FIG. 6, the compressed region 202a may be provided with weld pins but may also be provided with a doubler 260 along the planar compressed core region 222. One or more doublers may be provided as well. Preferably, the doubler 260 comprises a similar material as the top face sheet 210 of the honeycomb panel structure 200. In this illustrated arrangement, the doubler 260 extends from along the planar compressed region 222 from the first end of the compressed core region 202a to a start of the first incline 230. The second compressed core region 202b of the honeycomb panel structure 200 illustrated in FIG. 5 may be similarly structured. Alternatively, and as will be described and illustrated herein, the second compressed core region 202b of the honeycomb panel may be partially compressed and may be compressed from one or both honeycomb surfaces.

Alternatively, again based the loading parameters, different doubler configurations may also be utilized. As just another example, the doubler 260 may be provided along the planar compressed core region 222 and may extend partially up one or both of the inclines 230, 240. As yet another alternative, the doubler may be provided that extends up and over one or both of the inclines.

As can be seen more clearly from FIG. 6, a fastener hole 244 for fastening the honeycomb panel to other structures has been drilled near the middle of the compressed core region 202a. This mounting hole may be drilled and may be used to mount an attachment fitting. Although only one fastener hole is illustrated, more than one such hole can be provided. Again, the second compressed core region 202b may have a similar mounting hole configuration.

Figure 7:
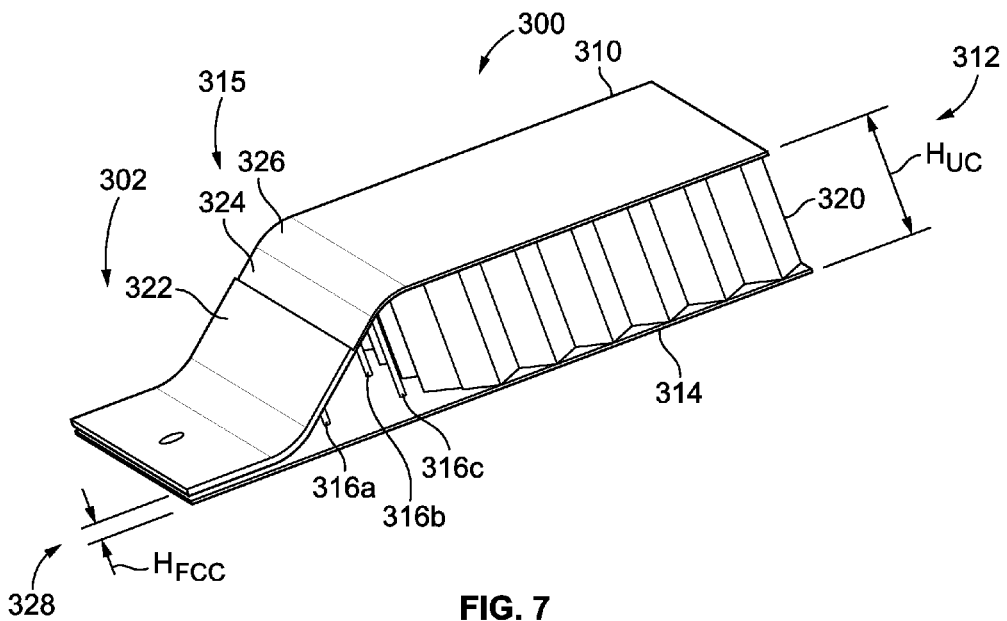
FIG. 7 illustrates a perspective view of another embodiment of a honeycomb panel structure with a compressed core region.
Figure 8:
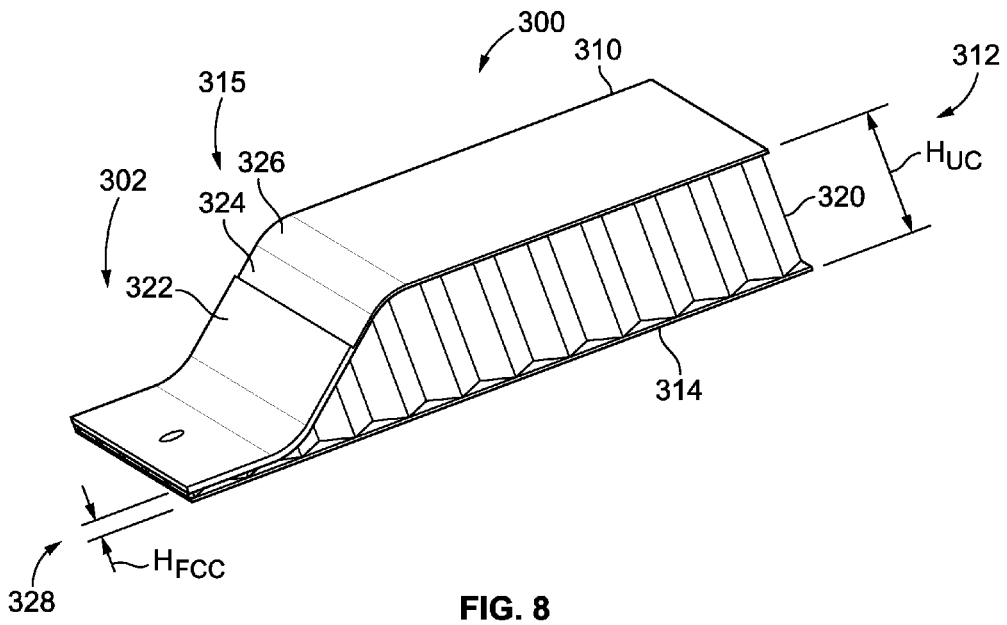
FIG. 8 illustrates an alternative view of the honeycomb panel structure with a compressed core region illustrated in FIG. 7.

FIG. 7 illustrates a perspective view of another embodiment of a honeycomb panel structure 300 comprising a compressed core region 302. The honeycomb panel structure 300 illustrated in FIG. 7 comprises essentially the same structure as the honeycomb panel structure illustrated in FIGS. 1 and 2. That is, this honeycomb panel structure 300 comprises a first or top face sheet 310 and a second or bottom face sheet 314 and a honeycomb core 320 residing between these two sheets. FIG. 8 illustrates an alternative view of the honeycomb panel structure 300 with a compressed core illustrated in FIG. 7 wherein the honeycomb core near the incline between the first or top face sheet and the second or bottom face has been replaced so that the structural reinforcing pins 316 a,b,c (FIG. 7) are now no longer visible. For ease of illustration, in FIG. 7, a portion of the honeycomb core 320 residing between the top face sheet incline 315 and the bottom sheet 314 has been omitted to help illustrate certain internal structural reinforcements (i.e., various pins 316 a,b,c).

In the illustrated arrangement of FIGS. 7 and 8, the honeycomb panel structure 300 comprises a completely compressed core region 302. That is, the upper face sheet 310 has been fully compressed against the core 320 and the bottom face sheet 314 wherein this fully compressed height is represented by $H_{FCC}$ 328 wherein this height can be compared to the height of the uncompressed honeycomb panel structure represented by $H_{UC}$ 312. In certain arrangements and for certain honeycomb core applications and as will be described in greater detail herein, the compressed core region in alternative compressed honeycomb arrangements may comprise a partially compressed core region wherein the height of such partially compressed core region may comprise any height between the uncompressed height $H_{UC}$ 312 and the fully compressed height $H_{FCC}$ 328. Furthermore, although they may not be required in all compressed honeycomb core applications, this honeycomb panel arrangement is provided with three overlapping doublers 322, 324, 326 near the compressed portion of the honeycomb panel structure 300.

Figure 9:
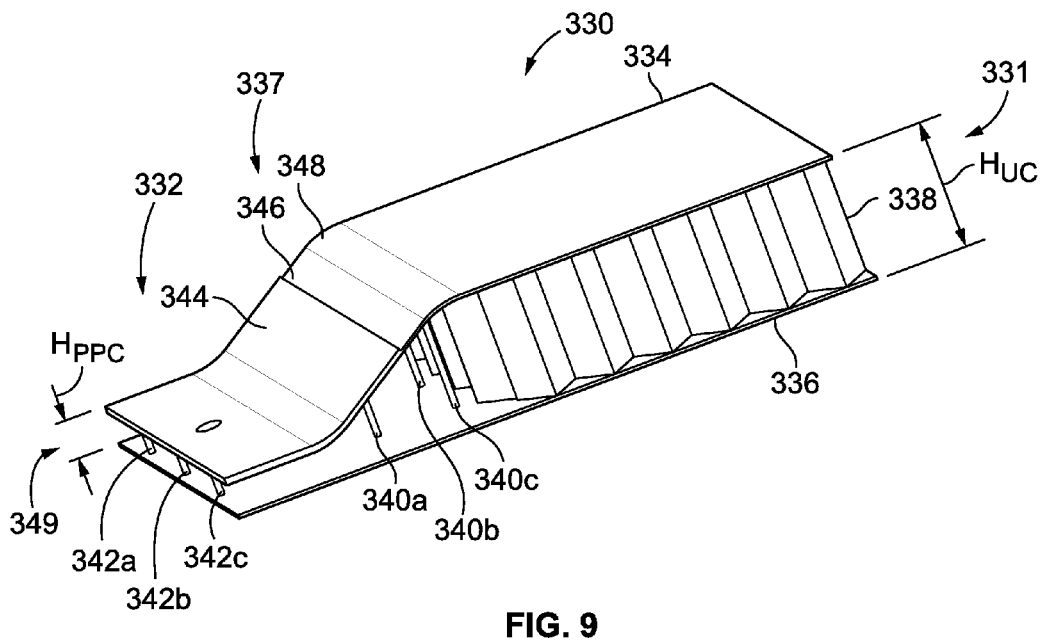
FIG. 9 illustrates a perspective view of another embodiment of a honeycomb panel structure with a compressed core region.

FIG. 9 illustrates yet another arrangement of a honeycomb panel structure 330 comprising a compressed core region 332. The honeycomb panel structure 330 illustrated in FIG. 9 comprises essentially the same structure as the honeycomb panel structure 300 illustrated in FIGS. 7 and 8. That is, this honeycomb panel structure 330 comprises a first or top face sheet 334 and a second or bottom face sheet 336 and a honeycomb core 338 residing between these two sheets.

Figure 10:
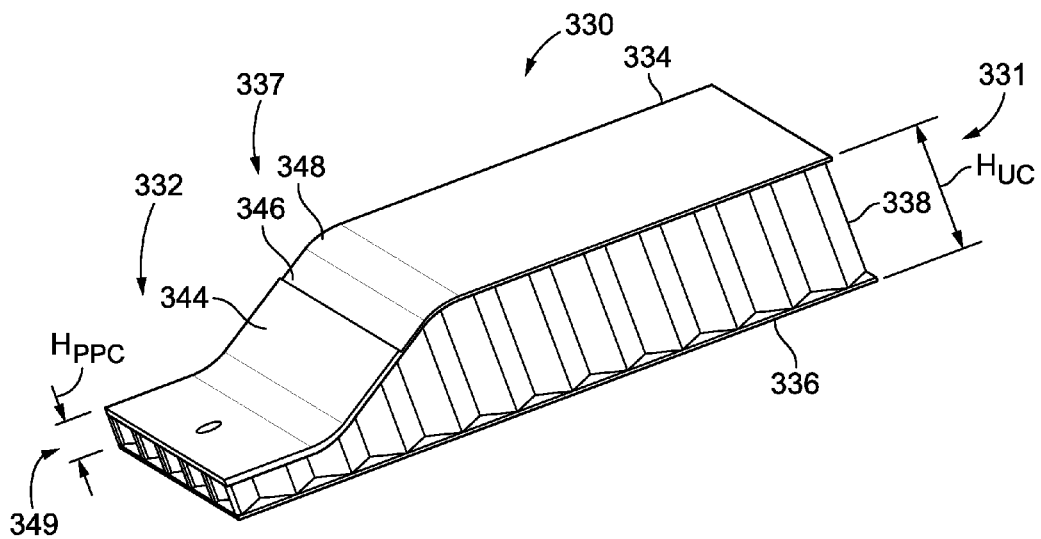
FIG. 10 illustrates an alternative view of the honeycomb panel structure with a compressed core region illustrated in FIG. 9.

For ease of illustration, in FIG. 9, a portion of the honeycomb core 320 residing between the top face sheet 334 and the bottom face sheet 336 along the incline 337 has been omitted to help illustrate certain structural reinforcements. For example, in this illustrated arrangement, such structural reinforcements comprise internal reinforcements by way of the various pins 340 a,b,c provided between the incline 337 and the bottom face sheet 336. Additional pins 342 a,b,c may be provided to support the planar partially compressed portion of the compressed core region 332 and resided between the top face sheet 334 and the bottom face sheet 336. FIG. 10 illustrates an alternative view of the honeycomb panel structure 330 with a compressed core illustrated in FIG. 9 wherein the honeycomb core near the incline between the first or top face sheet and the second or bottom face has been replaced so that the structural reinforcing pins are now no longer visible.

In the arrangement illustrated in FIGS. 9 and 10, the honeycomb panel structure 330 comprises a partially compressed core region 332. This core region is provided with three overlapping doublers 344, 346, 348 near the compressed portion of the honeycomb core structure 330. In this partially compressed core region, the top face sheet 334 has not been fully compressed against the core 338 and the bottom face sheet 336 wherein this partially compressed height is represented by height $H_{PCC}$ 349 which can be compared to the height of the uncompressed core which is represented by $H_{UC}$ 331. As such, the partially compressed core region may be compressed to a height that is smaller than the uncompressed core height $H_{UC}$ 331 but larger than a fully compressed height, such as the fully compressed height $H_{FCC}$ 328 of the compressed core region 302 illustrated in FIGS. 7 and 8.

As noted in the alternative compressed core arrangements illustrated in FIGS. 7-10, complete or partial compression of the core region may take place by compressing the top or first face sheet of the honeycomb core. That is, in these arrangements, only the first face sheet may be compressed so as to define an incline while the second face sheet will remain unchanged from its linear state. In alternative compressed core arrangements, compression of the core region may take place on both the upper and the lower face sheets of the honeycomb core. In one such preferred arrangement, core compression may take place along the top face sheet as well as the bottom face sheet so as to define a first incline in the first or top face sheet and a second incline in the second or bottom face sheet near the compressed panel region. During a honeycomb panel compression method, top face and bottom face compression may take place simultaneously or serially, that is, one after the other. In addition, such compression may comprise either a complete core compression (e.g., FIGS. 3-6) or a partial core compression (e.g., FIGS. 9-10).

Figure 11:
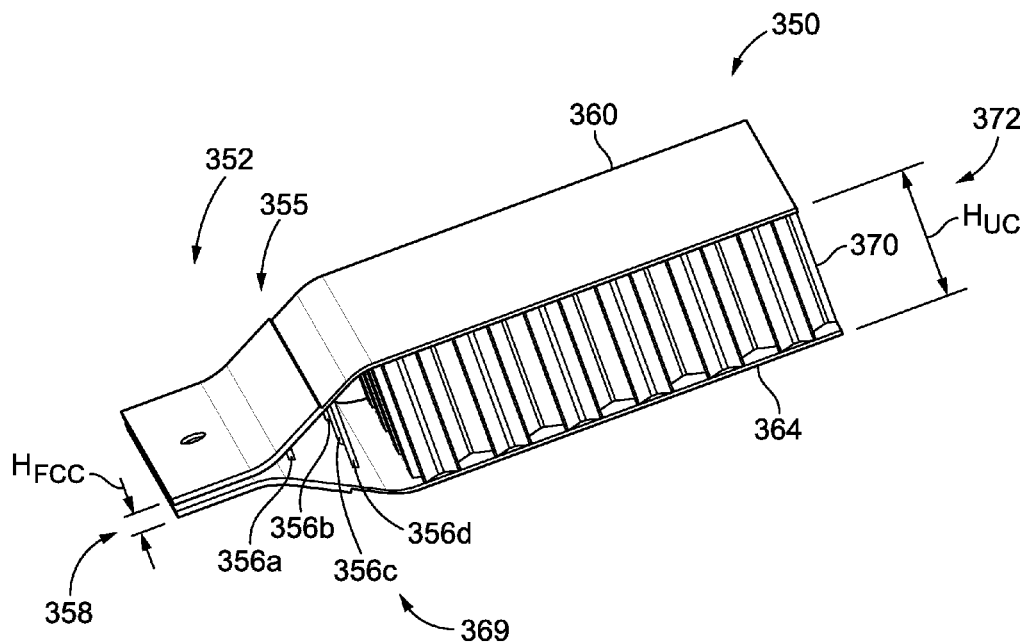
FIG. 11 illustrates a perspective view of another embodiment of a honeycomb panel structure with a compressed core region.

For example, FIG. 11 illustrates a perspective view of another embodiment of a honeycomb panel structure 350 comprising a compressed core region 352. The honeycomb panel structure 350 illustrated in FIG. 11 comprises essentially the same structure of the honeycomb panel structure illustrated in FIGS. 1 and 2. That is, this honeycomb panel structure 350 comprises a first or top face sheet 360 and a second or bottom face sheet 364 and a honeycomb core 370 residing between these two sheets 360, 364. Honeycomb panel structure 350, as illustrated, has a similar doubler configuration as the honeycomb panel structure 330 illustrated in FIGS. 9 and 10.

Figure 12:
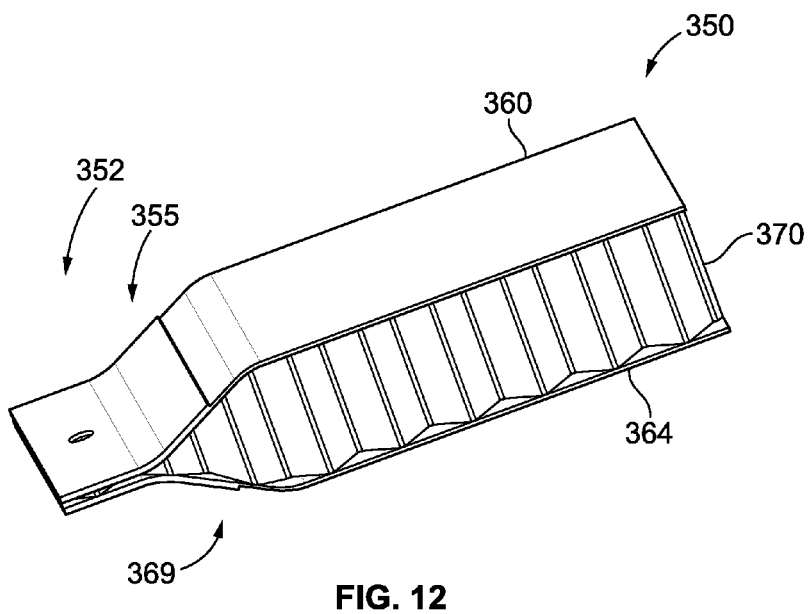
FIG. 12 illustrates an alternative view of the honeycomb panel structure with a compressed core region illustrated in FIG. 11.

For ease of illustration, in FIG. 11, a portion of the honeycomb core 370 residing between a first face sheet 360 and a second face sheet and residing between the first incline 355 and the second incline 369 has been omitted to illustrate certain compressed core structural reinforcements (i.e., various pins 356 a,b,c,d). FIG. 12 illustrates an alternative view of the honeycomb panel structure 350 with a compressed core illustrated in FIG. 11 wherein the honeycomb core residing between the first incline 355 and the second incline 369 has been removed so that the structural reinforcing pins 356 a,b,c,d are now no longer visible.

In this arrangement, the honeycomb panel structure 350 comprises a completely compressed core region 352. Specifically, in this arrangement, the first or top face sheet 360 is compressed towards the bottom face sheet 364 and the bottom face sheet 364 is compressed towards the top face sheet 360. As illustrated, the top face sheet 360 has been fully compressed against the core 370 and the bottom face sheet 364 wherein this fully compressed height is represented by height $H_{FCC}$ 358 which can be compared to the height of the uncompressed core which is represented by $H_{UC}$ 372. In certain arrangements and for certain applications and as will be described in greater detail herein, the compressed core region in alternative compressed honeycomb arrangements may comprise a partially compressed core region wherein the height of such partially compressed core region may be any height between the uncompressed core height $H_{UC}$ 372 and the fully compressed height $H_{FCC}$ 358. In this illustrated arrangement, the angle of the first incline 355 is generally equivalent to the angle of the second incline 369. However, in alternative compressed core arrangement, different angle orientations may also be used.

Figure 13:
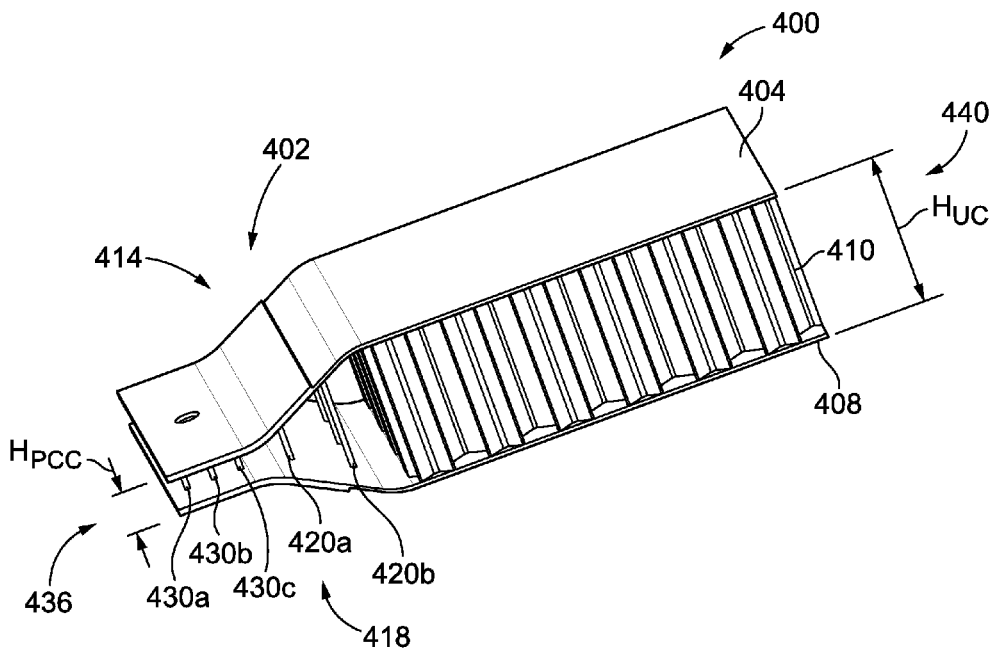
FIG. 13 illustrates a perspective view of another embodiment of a honeycomb panel structure with a compressed core region.

FIG. 13 illustrates yet another arrangement of a honeycomb panel structure 400 comprising a compressed core region 402. The honeycomb panel structure 400 illustrated in FIG. 13 comprises essentially the same structure as the honeycomb panel structure 300 illustrated in FIGS. 10 and 11. That is, this honeycomb panel structure 400 comprises a first or top face sheet 404 and a second or bottom face sheet 408 and a honeycomb core 410 residing between these two sheets. In addition, the honeycomb panel structure 400, as illustrated, has a similar doubler configuration as the honeycomb panel structure 330 illustrated in FIGS. 9 and 10.

Figure 14:
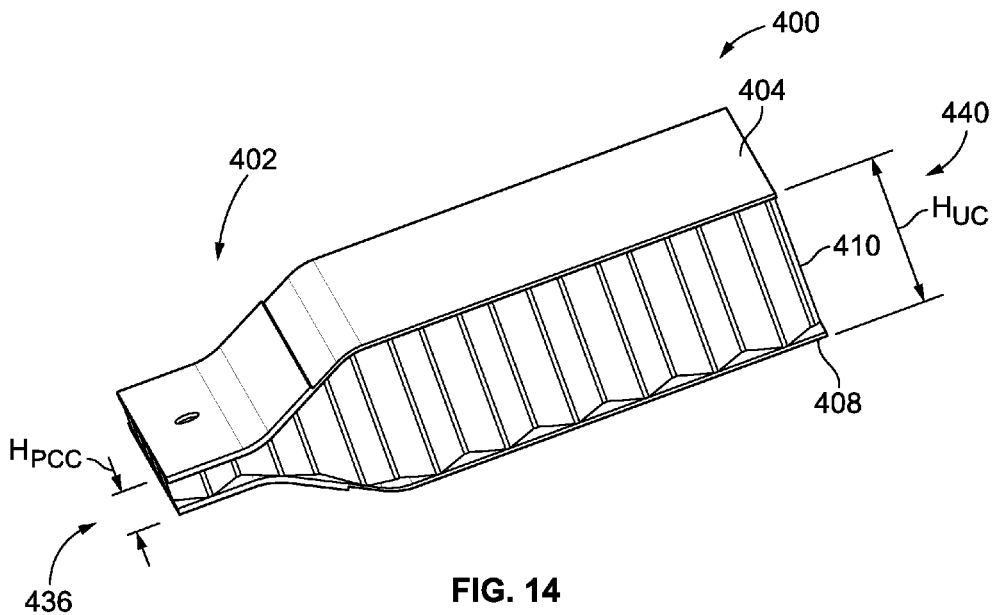
FIG. 14 illustrates an alternative view of the honeycomb panel structure with a compressed core region illustrated in FIG. 13.

For ease of illustration, in FIG. 13, a portion of the honeycomb core 410 residing between a first incline 414 and a second incline 418 has been omitted to illustrate certain compressed core structural reinforcements such as incline support pins 420 a, b and compressed core support pins 430 a,b,c. FIG. 14 illustrates an alternative view of the honeycomb panel structure 400 with a compressed core illustrated in FIG. 13 wherein the honeycomb core residing between the first face sheet incline 404 and the second or bottom face incline 408 has been replaced so that the structural reinforcing pins 420 and 430 are now no longer visible.

In this arrangement, the honeycomb panel structure 400 comprises a partially compressed core region 402. Specifically, in this arrangement, the first or top face sheet 404 is compressed towards the bottom face sheet 408 and the bottom face sheet 408 is compressed towards the top face sheet 404. As illustrated, the compressed core region 402 comprises a partially compressed core region. That is, the upper face sheet 404 has been partially compressed against the core 410 and the bottom face sheet 408 has also been partially compressed against the core 410. As such, the partially compressed height is represented by height $H_{PCC}$ 436 which can be compared to the height of the uncompressed core which is represented by $H_{UC}$ 440. In this illustrated arrangement, the angle of the first incline 414 is generally equivalent to the angle of the second incline 418. However, in alternative compressed core arrangements, different angle orientations may also be used.

In this illustrated arrangement, structural reinforcements comprise internal reinforcements include various pins 420 a,b that are provided between the first incline 414 and the second incline 418. Additional pins 430 a,b,c may be provided to support the planar partially compressed portion of the compressed core region 402 and resided between the first face sheet 404 and the bottom face sheet 408.

FIG. 16 illustrates a perspective view of another embodiment of a honeycomb panel structure 550 with a compressed core region 552. For example, FIG. 16 illustrates a first arrangement of a honeycomb panel structure 550 comprising a compressed core region 552. The honeycomb panel structure 550 illustrated in FIG. 16 comprises essentially the same structure of the honeycomb panel structure illustrated in FIGS. 1 and 2. That is, this honeycomb panel structure 550 comprises a honeycomb core assembled between a first or top face sheet 560 and a second or bottom face sheet 564 and a honeycomb core 568 residing between these two sheets.

Specifically, in this illustrated arrangement, the compressed core region of the honeycomb panel structure 550 comprises a localized compressed region in the form of a convex shaped compressed region, that is, a region that curves inwardly. With such a localized convex shaped region, the honeycomb panel structure 550 need not be compressed near an end of the panel but may be compressed anywhere along a main body of the panel structure 550, such as at a center of the panel. As described herein, such a convex shaped compression region may comprise a complete compressed core region or a partially compressed core region.

Figure 17:
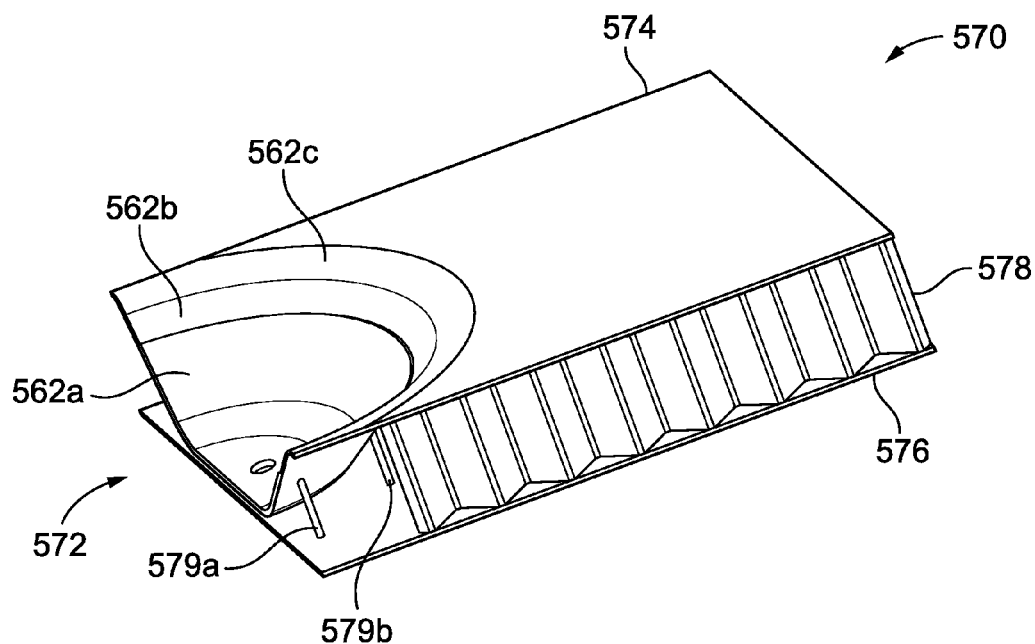
FIG. 17 illustrates a perspective view of another embodiment of a honeycomb panel structure with a compressed core region.
Figure 18:
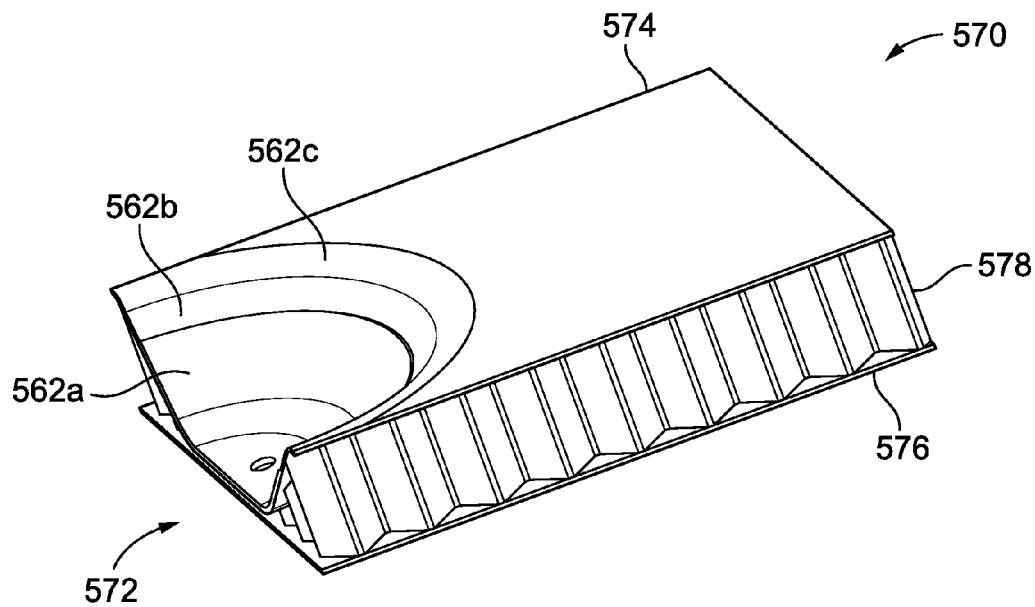
FIG. 18 illustrates an alternative view of the honeycomb panel structure with a compressed core region illustrated in FIG. 17.

For example, FIG. 17 illustrates a perspective view of another embodiment of a honeycomb panel structure 570 comprising a compressed core region 572. The honeycomb panel structure 570 illustrated in FIG. 17 comprises essentially the same structure as the honeycomb panel structure illustrated in FIGS. 1 and 2. That is, this honeycomb panel structure 570 comprises a first or top face sheet 574 and a second or bottom face sheet 576 and a honeycomb core 578 residing between these two sheets. FIG. 18 illustrates an alternative view of the honeycomb panel structure 570 with a compressed core illustrated in FIG. 17 wherein the honeycomb core near the compressed core region 572 between the first and second face sheets 574, 576 has been replaced so that the structural reinforcing pins 579 a, b (FIG. 17) are now no longer visible. For ease of illustration, in FIG. 17, a portion of the honeycomb core 570 residing between the top face sheet 574 and the bottom sheet 576 near the compressed core region 572 has been omitted to help illustrate certain internal structural reinforcements (i.e., various pins 579 a, b).

In the illustrated arrangement of FIGS. 17 and 18, the honeycomb panel 570 comprises a completely compressed core region 572. That is, the top face sheet 574 has been fully compressed against the core 578 and the bottom face sheet 576 is previously described herein. As discussed herein, the compressed core region 572 may further include structural reinforcements by way of one or more doublers 562 a,b,c.

Figure 19:
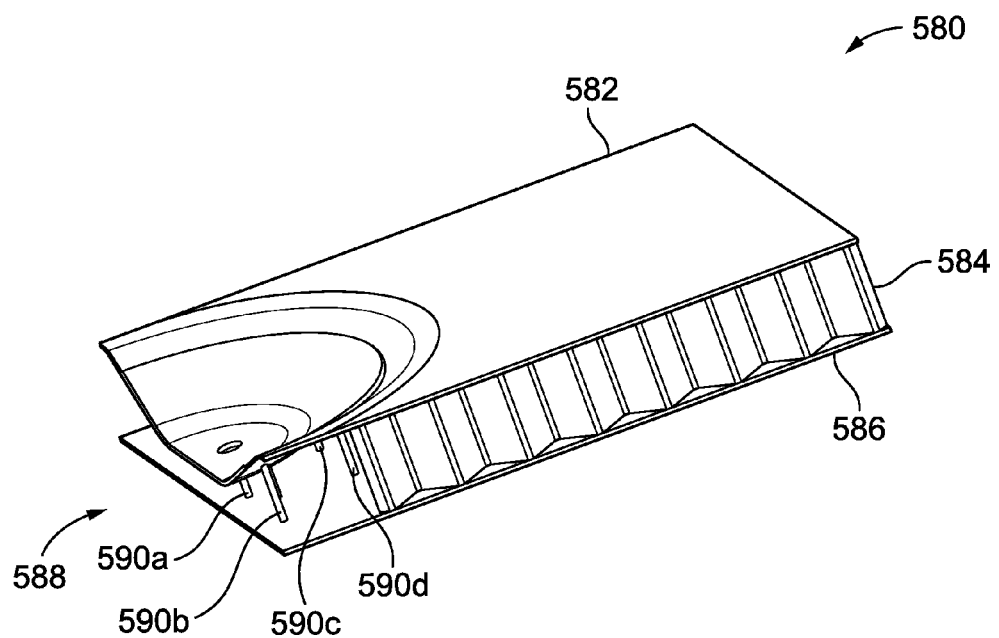
FIG. 19 illustrates a perspective view of another embodiment of a honeycomb panel structure with a compressed core region.
Figure 20:
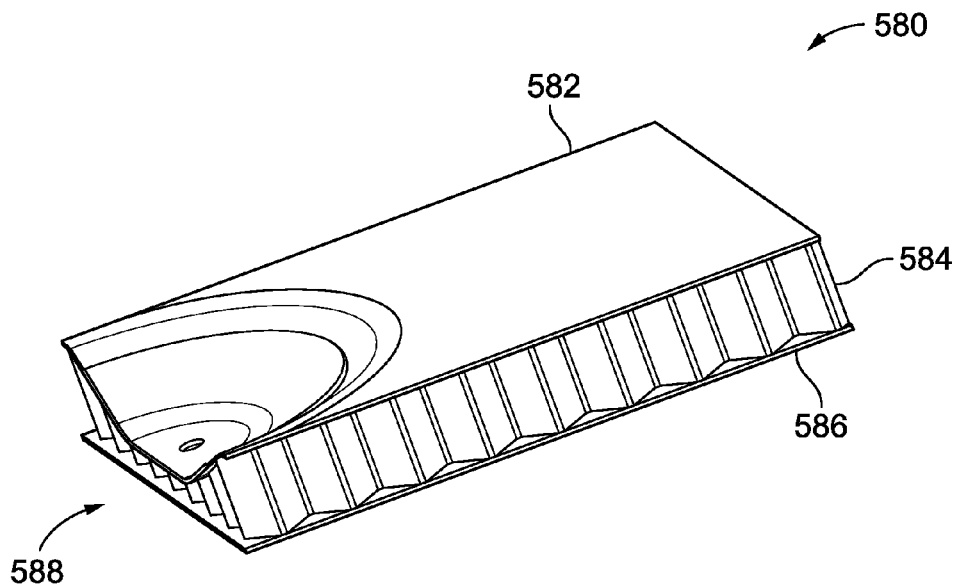
FIG. 20 illustrates an alternative view of the honeycomb panel structure with a compressed core region illustrated in FIG. 19.

FIG. 19 illustrates a perspective view of another embodiment of a honeycomb panel structure 580 comprising a compressed core region 588. The honeycomb panel 580 illustrated in FIG. 19 comprises essentially the same structure as the honeycomb panel structure illustrated in FIGS. 1 and 2. That is, this honeycomb panel structure 580 comprises a first or top face sheet 582 and a second or bottom face sheet 586 and a honeycomb core 584 residing between these two sheets. FIG. 20 illustrates an alternative view of the honeycomb panel structure 580 with a compressed core illustrated in FIG. 19 wherein the honeycomb core 584 near the compressed core region 588 between the first and second face sheets 582, 586 has been replaced so that the structural reinforcing pins 579 a, b (FIG. 19) are now no longer visible. For ease of illustration, in FIG. 19, a portion of the honeycomb core 584 residing between the top face sheet 582 and the bottom face sheet 586 near the compressed core region 584 has been omitted to help illustrate certain internal structural reinforcements (i.e., various pins 590 a,b,c,d).

In the illustrated arrangement of FIGS. 19 and 20, the honeycomb panel structure 580 comprises a partially compressed core region 588. That is, the upper face sheet 582 has only been partially compressed against the core 584 and the bottom face sheet 586 is previously described herein.

Figure 21:
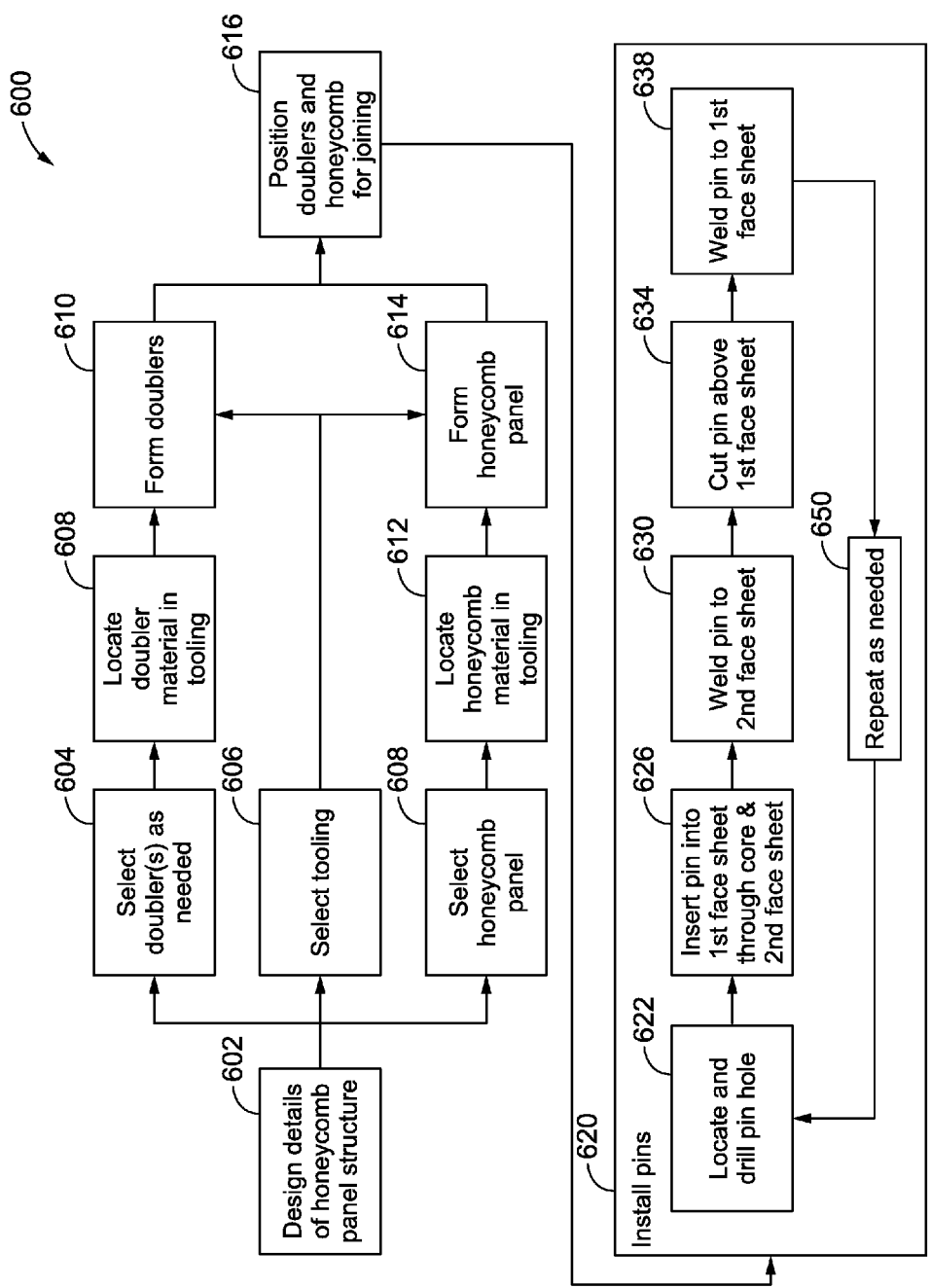
FIG. 21 is an illustration of a flow diagram of an embodiment of a method of the disclosure for making one of the embodiments of the compressed honeycomb panel structure of the disclosure.

FIG. 21 is an illustration of a flow diagram of an embodiment of a method 600 of the disclosure for making one of the embodiments of the compressed honeycomb core as disclosed herein using a honeycomb panel structure, such as the honeycomb panel structures illustrated herein. The method 600 comprises step 602 of defining certain general design criteria for the compressed honeycomb panel structure. As just one example, such design criteria might relate to the type of face sheets used by the honeycomb panel or relate to the thickness of the face sheets so these sheets are designed to handle the tensile, compressive, and shear stresses caused by the anticipated design load. In addition, the honeycomb core should be strong enough to withstand any shear stresses caused by the design loads. Moreover, in certain applications, the metallic bond or weld between the face sheets and the honeycomb core along with the structural reinforcements (as discussed in detail above) are designed to possess enough strength to carry shear stress into the core.

Additional general design criteria from step 602 could also related to the anticipated loading conditions of the honeycomb panel structure, including uniform distributed loads, end loading, point loading and possibly impact loads. Other design criteria could also include the honeycomb panel type (e.g., cantilever, simply supported), physical and space constraints including weight limit, thickness limit, deflection limit, and perhaps safety factors.

The method 600 also includes the step 608 of selecting a honeycomb panel structure. Such honeycomb panel structure may have a generally planar configuration or alternatively may have a different shape. Such a honeycomb panel structure may utilize a first face sheet and a second face sheet having similar or perhaps dissimilar material and/or mechanical properties. The method 600 also comprises the step of selecting a tooling arrangement at step 606 and also comprises the step 604 of selecting whether a certain type of structural reinforcements, such as doublers, are needed. If at step 604 the method determines that doublers are needed, then at step 608, these selected doublers are located in the selected tooling.

Once the doublers (if required) and the honeycomb material has been placed into the tooling at steps 608 and 612, the method 600 then performs a controlled compress of the honeycomb structure at steps 610 and 614 so as to achieve a desired compressed core shape having a desired compression depth as discussed in detail herein. As mentioned above, this controlled compress may take place along one or more selected portions or regions of the honeycomb panel. (i.e., an end region or a localized region). Moreover, this compression may take the form of a partial compression or a complete compression. Then, at step 616, the doublers are positioned on the compressed core for joining these two components, such as by welding.

Compression at steps 610 and 614 may take the form of either a hot or cold compression with tooling. The specific material used in the honeycomb core and the face sheets will tend to dictate if forming is accomplished in the "cold" or "hot condition. As those of ordinary skill in the art recognize, some materials are "cold" formable and others are not. Methods of hot forming include hot presses other methods of forming in a controlled thermal environment. In the cold condition, there are two die faces that have the desired final shape of the part.

Figure 22:
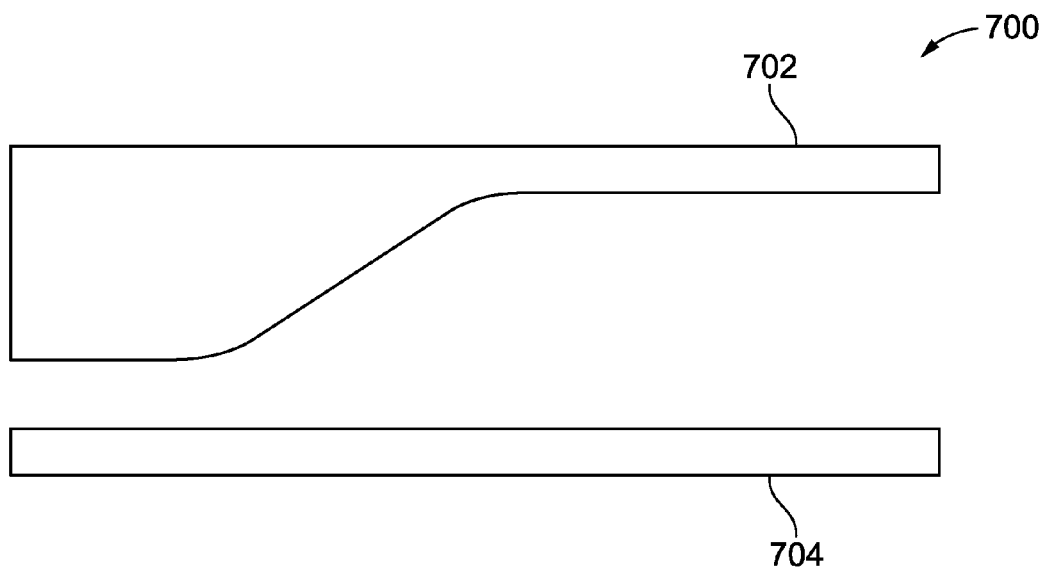
FIG. 22 illustrates one compression arrangement for compressing a honeycomb panel structure.
Figure 23:
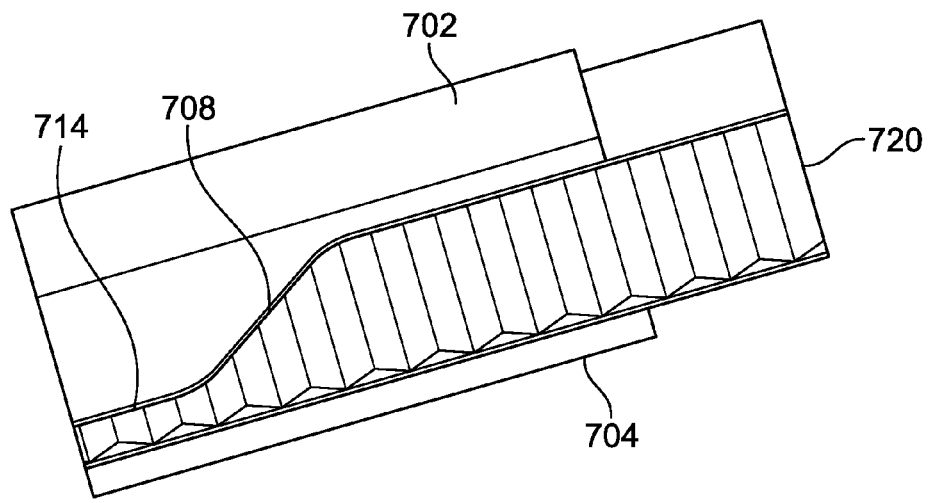
FIG. 23 illustrates the compression arrangement of FIG. 21 compressing a honeycomb panel structure in accordance with one aspect of the disclosure.

For example, FIG. 22 illustrates on cold forming arrangement 700 that may be used for compressing a honeycomb panel structure and/or doubler. In this arrangement, the forming arrangement comprises a first or upper die portion 702 and a second or lower die portion 704. Initially, the die portions 702, 704 are separated, and the honeycomb panel structure is placed into the first and second dies. These dies are then are forced together so as to form a compressed core 720, as illustrated in FIG. 23. As illustrated in FIG. 23, the first and second dies of FIG. 21 compressing a honeycomb core so as to define a compressed core portion 714. As illustrated, this compressed core portion comprises a partially compressed core portion 714 with a first incline 708 as discussed herein. Alternatively, the method may comprise the step of partially forming and then stress relieving the part prior to further forming steps.

Alternatively, if a hot condition is used to form the compressed core, the die surfaces are heated as well as the part itself. The hot die surfaces are then forced together to the extent desired. This may be accomplished using a heated press or inflating bladders that use gas pressure to translate one or both die surfaces. As just one example, such tooling may comprise essentially a press structure having two die faces wherein these die faces come together under load so as to compress the honeycomb core.

Moreover, and as noted above, in one arrangement, the core may be compressed only from the top of the honeycomb core or only from the bottom of the core. Alternatively, the core may be simultaneously compressed from both the top and bottom directions.

Returning to the method 600 illustrated in FIG. 21, after the honeycomb panel structure is compressed, the method further comprises step 620 where it is determined if structural re-enforcements by way of pins are to be provided to the compressed honeycomb panel. If structural enforcements by way of pins are required, at step 622 it is determined at step 622 where these pins are to be located are to be provided along the panel, and how many of the enforcements are to be used.

For example, in the situation where the compressed core requires weld pins, at step 622, a number of weld pin holes are drilled in the desired honeycomb panel area. This desired area could be the compressed region, the non-compressed region, or both types of regions of the honeycomb panel. At step 626, the pins are then inserted into the first face sheet, through the compressed core, and the second face sheet. At step 630, the method 300 also includes the step of welding the pin or pins to the second face sheet. Then, at step 634, the method includes the step of cutting the pin above the first or top face sheet. Thereafter, at step 638, the pin is welded to the first or top face sheet. The step of inserting and welding the pins in place may be repeated at step 650.

Once the desired structural reinforcements have been fabricated and welded onto the structure, the method 600 may further includes the step of determining whether the general design criteria determined requires a mounting hole. If one or more mounting holes are required, the hole is drilled. Thereafter, the honeycomb panel is assembled by either being mounted to an external structure or provided with an attachment fitting for structural mounting.

The embodiments of the disclosed compressed sandwich structures with the intentionally compressed honeycomb core and embodiments of the method for making the same have numerous advantages. For example, the composite sandwich structure as disclosed herein reduces the overall weight of a structure by avoiding the use of heavier materials to facilitate strength to bear concentrated loads. The metallic sandwich structure also further reduces weight of a structure by eliminating the need for costly machined attachment fittings. Moreover, the compressed honeycomb core also reduces costs by way of a reduced "buy to fly" ratio of material purchased to machine attachment fittings. That is, the compressed honeycomb core does not require an undesirable amount labor or machining in order to prepare the panel for final installation into the components and subassemblies, such as in airplane components and subassemblies.

Furthermore, the compressed honeycomb core will reduce costs by eliminating the labor costs and machining time of fabricating attachment fittings typically associated with conventional honeycomb panel structures. As such, the compressed honeycomb core will also further reduce costs by eliminating the cost of additional cutting tools and related maintenance expenses.

Furthermore, the compressed honeycomb core will reduce the total cycle time of component and subassembly structures by eliminating the fabrication time necessary to manually cut out honeycomb panels sections for the attachment fittings. As such, the presently disclosed honeycomb panels and methods will also reduce the amount of time and expense for welding these attachment fittings to the cut out honeycomb core.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. A method of forming a honeycomb panel structure comprising the steps of:
    compressing the honeycomb panel structure in a first panel region, wherein the first panel region comprises an incline face sheet and a bottom face sheet, and wherein the incline face sheet is at an acute angle to the bottom face sheet;
    reinforcing at least a portion of the first panel region;
    drilling a plurality of holes in the first panel region; and
    inserting a plurality of pins into the first panel region, wherein a first pin of the plurality of pins is perpendicular to the incline face sheet, and wherein a second pin of the plurality of pins is perpendicular to the bottom face sheet.

2. The method of claim 1, further comprising:
    drilling a plurality of holes in an uncompressed panel region adjacent to the first panel region;
    inserting a second plurality of pins into the uncompressed panel region; and
    welding the second plurality of pins into a face sheet of said honeycomb panel structure.

3. The method of claim 1 wherein the step of reinforcing at least a portion of the first panel region comprises the steps of:
    utilizing at least one welded pin to add at least one additional face sheet to the honeycomb panel structure.

4. The method of claim 1 wherein the honeycomb panel comprises a metallic honeycomb panel.

5. The method of claim 1 further comprising the step of welding the plurality of pins into a face sheet of the honeycomb panel structure.

6. The method of claim 1, further comprises the step of:
    compressing the honeycomb panel structure in a second region that is distinct from the first region.

7. The method of claim 1 wherein the honeycomb panel structure has an un-compressed panel height in the uncompressed panel region, wherein the step of compressing the honeycomb panel structure in the first region comprises compressing the honeycomb panel structure so that the height of the compressed honeycomb panel structure is a fully-compressed height that is lower than the un-compressed panel height and lower than a partially-compressed height.

8. The method of claim 1 wherein the honeycomb panel structure has an un-compressed panel height in the uncompressed panel region, wherein the step of compressing the honeycomb panel structure in the first region comprises the step of partially compressing the honeycomb panel structure in the first region to form a partially compressed region with a height in the partially compressed region is lower than the un-compressed panel height and is higher than a fully-compressed height.

9. The method of claim 1 wherein the honeycomb panel structure comprises at least one substantially planar shape.

10. The method of claim 1 wherein the first panel region comprises an end region of the honeycomb panel structure.

11. The method of claim 1 wherein the first panel region comprises a localized region of the honeycomb panel structure.

12. The method of claim 1 wherein the incline face sheet has a first thickness, wherein the bottom face sheet has a second thickness that is different that the second thickness.

13. The method of claim 1 further comprising the step of attaching at
    least one additional face sheet to at least a portion of the compressed core region.

14. The method of claim 13 wherein the at least one additional face sheet comprises a first metal and honeycomb panel structure comprises a second metal, the second metal different than the first metal.

\* \* \* \* \*